2,837,333
APPARATUS FOR SEPARATING FLAT ARTICLES

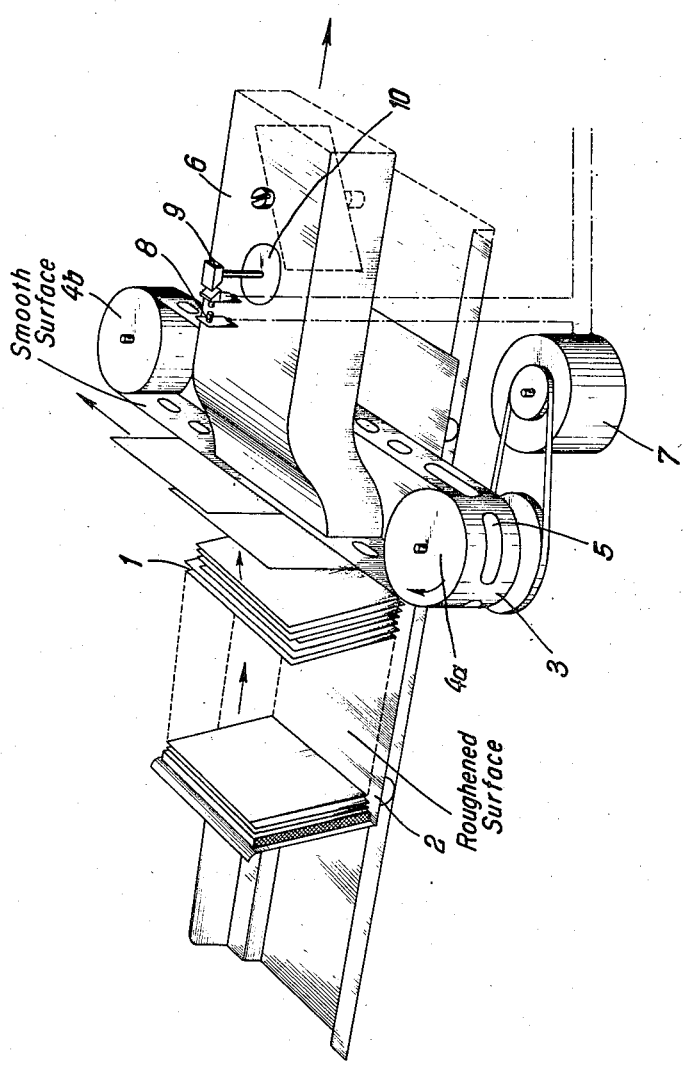

Willy Sindzinski, Berlin, and Günther Dannehl, Berlin-Wilmersdorf, Germany, assignors to International Standard Electric Corporation, New York, N. Y., a corporation of Delaware Application August 5, 1955, Serial No. 526,599

Claims priority, application Germany August 23, 1954

1 Claim. (Cl. 271—12)

This invention relates to apparatus for separating from each other flat articles which have been piled or stacked up. Such articles may be of paper, cardboard, thin sheet metal, or other such material, which articles are to be conveyed individually from the pile to some form of processing device. Preferably, this conveyance is performed with the aid of a rotary endless conveyor. The articles may, for example, be documents, letters, newspapers, or postcards which are required to be conveyed to a stamping or signing device.

It is know to provide conveyors with suction appliances such as suction arms or necks which are arranged at each operation to take a single article from the pile. Such appliances must be so controlled that when seizing the respective article they shall be rendered effective while after the articles have been delivered to the conveyor they shall be rendered ineffective. Accordingly, rhythmically controlled valves must be provided. Moreover, if the suction appliances are fastened directly to the conveyor, this conveyor and the suction source are difficult to unite together since the suction duct must be movable.

The arrangement of the present invention avoids the shortcomings attributable to controlling the suction and to the suction duct having to be movable. According to one feature of the invention the conveyor comprises an endless perforated band which is moved to pass closely by the outlet of the suction duct. This outlet extends so far along the band that an article, caused by the suction to stick to the band, is conveyed far enough to be taken up by another conveyor or by a processing appliance.

The above and other features of the invention will be understood from the following description, reference being had to the accompanying drawing which shows a perspective view of an apparatus according to the invention.

A pile of letters 1 is carried on a truck or carrier 2 guided by rails. The front side of each letter is turned toward a conveyor band 3, held in position by rollers 4a, 4b and adapted to be driven in any suitable manner. The band 3 is formed with equally spaced apertures 5 along its length and faces the outlet of a suction duct 6. Any letter caused by the suction in duct 6 to adhere to the band 3 remains adhered to it as long as the letter, carried along by the band, is in front of the outlet of the duct. As soon as the letter has thus been moved past the duct, it will no longer be held fast by the band 3 and can hence be taken up by another device such as another conveyor band. Alternatively the band 3 may extend up to the place at which the letters or other articles are to be delivered, and a second band may be arranged to co-operate with it in such manner as to continue the conveying of the letter or other article as soon as the suction in duct 6 becomes ineffective.

The width of the suction outlet and the position thereof with respect to the pile of the articles, such as letters, determine the distance at which the articles when transferred to an additional conveyor will be spaced apart. The arrangement may thus be such that a letter will be sucked off the pile 1 whilst the preceding one is still sticking to the band 3. This procedure is illustrated in the drawing. An overlap of the letters will result in this way. The overlap may be made to be such as to enable the row of letters or the like to be introduced into a stamping machine that serves to cancel the stamps.

The distances at which the articles will be spaced apart on the band 3 after separation from each other may be predetermined by suitable location of the apertures 5. For example, a row of such apertures or one elongated slot may be arranged to correspond to the length of the articles, and these rows or slots may be spaced apart at the distances at which it is desired that the articles shall be spaced from each other. In this way the distances between the articles may be made to be larger than they can be in the case that the apertures 5 are distributed equally.

The articles will be applied to band 3 correctly if the truck 2 is so constructed that they assume a backwardly-inclined position as shown in the drawing. The lower surface of the truck 2 on which the pile of letters rests should preferably be roughened in order to avoid the possibility of two or more articles being picked up and conveyed together. The inner surface of the band 3, however, should be as smooth as possible and the band may to this end be made of metal foil or some synthetic product. In this way detrimental friction between the parts 3 and 6, bearing against each other, is prevented. The outer side of band 3 may be coated with a friction layer such as foam rubber, in which case even heavy articles will stick safely to the band.

The motor 7 for driving the band 3 should be operated only when truck 2 has been loaded and the arrangement is ready for service. According to a feature of the invention the motor 7 is controlled directly with the aid of the suction duct 6. Switch contacts 8 for closing the motor circuit are actuated by an arm 9 secured to a diaphragm 10 mounted in the wall of the duct 6 whereby the difference between the pressure existing when the suction outlet is open and the pressure existing with this outlet closed by a letter or the like is caused to actuate the contacts 8 to close the circuit of the motor 7.

Preferably the suction duct contains means such as a throttle valve for throttling the air flow in accordance with the force necessary to convey articles of different weights.

The arrangement is here described as suitable for use with a stamping machine but is also applicable to other uses. For instance, it may be employed in connection with a machine for the addressing of letters, or a machine for affixing the stamps, or with an arrangement for the treatment or processing of paper, cardboard, sheet metal, etc., that is, to any machine or device which requires the respective articles to be conveyed to it separately from each other and at equal distances apart.

What is claimed is:

Apparatus for separating flat articles from a stack and for conveying them individually to another position, comprising a perforated conveyor member, an electro motor for driving said conveyor member, a carrier for said stack of articles disposed adjacent one side of said conveyor member, a suction duct having an outlet disposed adjacet the other side of said conveyor member opposite said carrier, a diaphragm mounted in the wall of said suction duct, a pair of electrical contacts, means for connecting said contacts in the energizing circuit of said motor, and means mounted on said diaphragm for closing said contacts.

References Cited in the file of this patent

UNITED STATES PATENTS

| | | |
|---|---|---|
| 2,019,721 | Nejedly | Nov. 5, 1935 |
| 2,425,210 | Stokes | Aug. 5, 1947 |
| 2,680,615 | Edgar | June 8, 1954 |